(12) United States Patent
Zhu et al.

(10) Patent No.: US 12,119,778 B2
(45) Date of Patent: Oct. 15, 2024

(54) FAST ACTIVE POWER OUTPUT REDUCTION SYSTEM OF DOUBLY-FED INDUCTION GENERATOR AND METHOD THEREOF

(71) Applicant: TIANJIN UNIVERSITY, Tianjin (CN)

(72) Inventors: Jiebei Zhu, Tianjin (CN); Zhaoshun Deng, Tianjin (CN); Feng Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 542 days.

(21) Appl. No.: 17/308,929

(22) Filed: May 5, 2021

(65) Prior Publication Data

US 2022/0069751 A1    Mar. 3, 2022

(51) Int. Cl.
| | | |
|---|---|---|
| *H02P 9/10* | (2006.01) | |
| *F03D 9/25* | (2016.01) | |
| *H02J 3/00* | (2006.01) | |
| *H02P 9/00* | (2006.01) | |
| *H02P 21/00* | (2016.01) | |
| *H02P 101/15* | (2016.01) | |

(52) U.S. Cl.
CPC ............. *H02P 9/10* (2013.01); *F03D 9/25* (2016.05); *H02J 3/00* (2013.01); *H02P 9/00* (2013.01); *H02P 21/00* (2013.01); *F05B 2270/32* (2013.01); *H02P 2101/15* (2015.01)

(58) Field of Classification Search
CPC .... H02P 9/00; H02P 9/10; H02P 21/00; H02J 3/00
See application file for complete search history.

*Primary Examiner* — Sean Gugger (57) ABSTRACT

The present invention discloses a FPR system of DFIG, comprising a DC chopper circuit made up of a fully-controlled power switching device and a dump resistor first connected in series and then connected to the positive and negative poles of the DC-link; the fully-controlled power switching device is driven by a power switching device driver; the power switching device driver comprises a first inverting adder, a first PI controller and a PWM modem; the positive and negative input ends of the first inverting adder receive the real-time DC-link voltage signal and its threshold value respectively, and the output end of the first inverting adder is connected to the input end of the first PI controller; the output end of the first PI controller is connected to the input end of the PWM modem; the PWM modem outputs the pulse signal to the control end of the fully-controlled power switching device.

4 Claims, 7 Drawing Sheets

FAST ACTIVE POWER OUTPUT REDUCTION SYSTEM OF DOUBLY-FED INDUCTION GENERATOR AND METHOD THEREOF

CROSS REFERENCE TO RELATED APPLICATION

This application claims priority from the Chinese patent application 2020109478071 filed Sep. 1, 2020, the content of which is incorporated herein in the entirety by reference.

TECHNICAL FIELD

The present invention relates to the technical field of wind power generation, in particular to a Fast active Power output Reduction (FPR)system of doubly-fed induction generator (DFIG) and method thereof.

BACKGROUND OF THE PRESENT INVENTION

At present, wind turbine generators (WTGs) are operated in the maximum power point tracking (MPPT) mode, which exhibits the characteristics of high intermittency and fluctuation in their power outputs as well as reduced inertia contribution to the AC power grid which deteriorates system frequency stability. Therefore, the increasing penetration level of wind power brings serious challenges to the safe and stable operation of power grid.

The grid codes of many countries have required the WTGs to rapidly drop their power outputs under grid emergency conditions such as transmission network congestion, high voltage direct current (HVDC) system commutation failure and short-circuit fault, so as to mitigate the above negative impacts of wind power. FPR can be readily achieved by controlling the voltage-sourced converters (VSCs) inside the WTGs. However, the excessive power incurred from the mismatch between WTG's mechanical power input and its electrical power output is accumulated in the form of rotor kinetic energy, causing rotor over-speed that potentially damage the WTG mechanical components and even shut down the WTG system. Although this problem can be mitigated by adjusting the pitch angle to decrease the amount of mechanical power input, its effect is inconspicuous due to the slow action of pitch angle.

Thus, the incorporation of extra energy storage/dissipation components is demanded to absorb the excessive power. Considering that the energy storage system (ESS) may be economically unsuitable for the infrequent WTG FPR due to its high cost, and the state of art of ESS technology still has implementation issues such as low energy density, low charging/discharging rate, and low service life, etc., the DC chopper is a more reasonable choice for the excessive power absorption. However, conventional MPPT mode is maintained under the existing schemes introduced with DC chopper, which makes the unbalanced energy continuously exist so that the issue of excessive energy after FPR is not fundamentally resolved and the DC chopper needs to operate throughout the execution of FPR to absorb the excessive power which will aggravate the operational cost for the execution of FPR.

SUMMARY OF THE PRESENT INVENTION

The present invention provides an FPR system of DFIG and method thereof in order to overcome the technical problems existing in the prior art. The present invention is designed to prevent the drawbacks of rotor over speed or the continuous engagement of excessive energy dissipation device due to the inability of the existing control schemes to timely dissipate or fundamentally eliminate the unbalanced energy during the execution of DFIG FPR under grid abnormal conditions.

To solve the existing problems in the prior art, the following technical solution is employed: an FPR system, comprising a pitch servo system, a DC-link and a rotor-side converter(RSC) and a grid-side converter (GSC) connected in parallel across the two poles of the DC-link; and further comprising a DC chopper circuit, which includes a dump resistor and a fully-controlled power switching device; the dump resistor and the fully-controlled power switching device are first connected in series and then connected to the positive and negative poles of the DC-link, respectively; the fully-controlled power switching device is driven by a power switching device driver; the power switching device driver comprises a first inverting adder, a first PI controller and a PWM modem; positive and negative input ends of the first inverting adder receive real-time DC-link voltage signal and its threshold value respectively, and the output end of the first inverting adder is connected to an input end of the first PI controller; an output end of the first PI controller is connected to an input end of the PWM modem; the PWM modem outputs the pulse signal to the control end of the fully-controlled power switching device.

Further, RSC is driven by an RSC dual closed-loop vector control unit; the RSC dual closed-loop vector control unit comprises an RSC inner current loop and an RSC outer power loop; wherein the RSC outer power loop consists of two branches, wherein one branch includes a power conversion unit that converts the WTG rotor speed to the WTG stator active power reference, a second inverting adder and a second PI controller that connected in sequence; the other branch includes a third inverting adder and a third PI controller that connected in sequence; the output ends of the two branches are connected to the input end of the RSC inner current loop via a first multiplexer switch, a control end of the first multiplexer switch receives the control signal from an upper-level controller; the power conversion unit receives the signal of real-time rotor speed and outputs the stator active power reference according to the wind turbine MPPT curve; the second inverting adder, whose positive input end is connected to the output end of the power conversion unit, and whose negative input end receives the signal of actual stator active power; the third inverting adder, whose positive end and negative input end receive the FPR command value and the actual DFIG active power output to the grid respectively; the two data input ends of the first multiplexer switch receive the active current references generated from the second PI controller and the third PI controller respectively.

Further, GSC is driven by a GSC dual closed-loop vector control unit; the GSC dual closed-loop vector control unit comprises a GSC inner current loop and a GSC outer voltage loop; wherein the GSC outer voltage loop consists of a DC-link voltage conversion unit that converts the rotor speed deviation to the DC-link voltage reference, a fourth inverting adder, a fifth inverting adder, a fourth PI controller and a second multiplexer switch; the real-time rotor speed and the optimal rotor speed under MPPT mode are input to positive and negative input ends of the fourth inverting adder, the fourth inverting adder outputs the rotor speed deviation to the DC-link voltage conversion unit, the DC-link voltage conversion unit outputs a DC-link voltage reference; the two data input ends of the second multiplexer switch receive the rated DC-link voltage and the DC-link voltage reference generated from the DC-link voltage conversion unit respectively; an output end of the second multiplexer switch is connected to a positive input end of the fifth inverting adder; a negative input end of the fifth inverting adder receives signal of the real-time DC-link voltage, the fifth inverting adder outputs the DC-link voltage deviation to the fourth PI controller; the fourth PI controller outputs the reference of active current flowing into GSC to the GSC inner current loop; a control end of the second multiplexer switch receives the control signal from the upper-level controller.

Further, the pitch servo system comprises a pitch servo driver that drives the pitch servo motor, a wind power coefficient calculator, a pitch angle command lookup table, a sixth inverting adder, a fifth PI controller and a third multiplexer switch; the wind power coefficient calculator receives the FPR command value and outputs a wind power coefficient to the pitch angle command lookup table, wherein the wind power coefficient is calculated in the condition that the captured mechanical power input by WTG is equal to the FPR command; the pitch angle command lookup table outputs a pitch angle command corresponding to the calculated wind power coefficient; positive and negative input ends of the sixth inverting adder receive signals of real-time rotor speed and the rated rotor speed respectively, the output end of the sixth inverting adder is connected to the input end of the fifth PI controller; the fifth PI controller outputs a pitch angle reference; the two data input ends of the third multiplexer switch receive the pitch angle command from the pitch angle command lookup table and the pitch angle reference from the fifth PI controller; a data output end of the third multiplexer switch is connected to the pitch servo driver; a control end of the third multiplexer switch receives the control signal from the upper-level controller.

The present invention further provides a method of FPR system of DFIG, comprising: adopting the pitch servo system, the DC-link and the rotor-side converter (RSC) and the grid-side converter (GSC) connected in parallel across the two poles of the DC-link for regulation and control purpose, and further introducing the DC chopper circuit including the dump resistor and the fully-controlled power switching device; first connecting the dump resistor and the fully-controlled power switching device in series and then connecting them to the positive and negative poles of the DC-link; the fully-controlled power switching device is driven by the power switching device driver; adopting the first inverting adder, the first PI controller and the PWM modem in the power switching device driver; inputting the real-time DC-link voltage signal and its threshold value to the positive and negative input ends of the first inverting adder respectively, outputting the signal from the first inverting adder to the first PI controller; outputting the signal from the first PI controller to the PWM modem in order to regulate the duty cycle of the pulse signal generated from PWM modem; outputting the pulse signal from the PWM modem to the control end of the fully-controlled power switching device.

Further, adopting the RSC dual closed-loop vector control unit, comprising the RSC inner current loop and the RSC outer power loop, to drive RSC; wherein two branches are introduced in the RSC outer power loop, where in one branch includes a power conversion unit that converts the rotor speed to the WTG stator active power reference, a second inverting adder and a second PI controller that connected in sequence; the other branch includes a third inverting adder and a third PI controller that connected in sequence; inputting the real-time rotor speed to the power conversion unit and outputting the stator active power reference from the power conversion unit according to the wind turbine MPPT curve; calculating the error between the rated power and the actual stator active power by the second inverting adder, and inputting this error to the second PI controller; calculating the error between the FPR command value and the actual DFIG active power output by the third inverting adder; and inputting the error to the third PI controller; outputting the active current reference signals from the second PI controller and the third PI controller to the two data input ends of the first multiplexer switch; selecting between the signals output from the output ends of the second PI controller and the third PI controller via the second multiplexer switch based on the received control signal from the upper-level controller and transmitting it to the input end of the RSC inner current loop.

Further, adopting the GSC dual closed-loop vector control unit, comprising the GSC inner current loop and the GSC outer voltage loop, to drive GSC; wherein the GSC outer voltage loop introduces the DC-link voltage conversion unit that converts the rotor speed deviation to the DC-link voltage reference, the fourth inverting adder, the fifth inverting adder, the fourth PI controller and the second multiplexer switch; calculating the error between the real-time rotor speed and the optimal rotor speed under MPPT mode through the fourth inverting adder and converting the error into the DC-link voltage reference through the DC-link voltage conversion unit; selecting the signal of the rated DC-link voltage or the DC-link voltage reference output from the DC-link voltage conversion unit via the second multiplexer switch based on the received control signal from the upper-level controller and transmitting it to the positive input end of the fifth inverting adder, inputting the real-time DC-link voltage to the negative input end of the fifth inverting adder; connecting the output end of the fifth inverting adder to the input end of the fourth PI controller; outputting the reference of active current flowing into GSC from the fourth PI controller to the GSC inner current loop.

Further, adopting the pitch servo driver in the pitch servo system to drive the pitch servo motor, the wind power coefficient calculator, the pitch angle command lookup table, the sixth inverting adder and the fifth PI controller and the third multiplexer switch; inputting the FPR command value and the maximum mechanical power of WTG operating under MPPT mode to the wind power coefficient calculator, outputting the wind power coefficient from the wind power coefficient calculator to the pitch angle command lookup table, wherein the wind power coefficient is calculated in the condition that the captured mechanical power input by WTG is equal to the FPR command; outputting the pitch angle command corresponding to the calculated wind power coefficient from the pitch angle command lookup table; calculating the error between the real-time DFIG rotor speed and its rated value through the sixth inverting adder and outputting this error to the fifth PI controller; outputting the pitch angle reference from the fifth PI controller; selecting between signals of the pitch angle command and the pitch angle reference via the second multiplexer switch based on the received control signal from the upper-level controller and inputting it to the pitch servo driver.

Further, the wind power coefficient calculator calculates the wind power coefficient in the condition that the captured mechanical power input by WTG is equal to the FPR command, based on the following formular:

$$C_{P0} = \frac{P_m}{P_0} = \frac{P_e^*}{P_{max}} C_{Pmax}$$

where $C_{P0}$ is the calculated wind power coefficient, $P_m$ is the WTG mechanical power input, $P_e^*$ is the FPR command value, $P_0$ is the wind power that drives the blades of the wind turbine to rotate, $P_{max}$ is the maximum mechanical power of WTG operating under MPPT mode and $C_{Pmax}$ is the maximum wind power coefficient.

Further, the pitch angle command lookup table is established by the following approach:
establishing the relationship between the wind power coefficient and tip speed ratio, and making the tip speed ratio to be equal to the optimal value under the MPPT mode, so that the pitch angle command value corresponding to the above calculated wind power coefficient can be derived from the following formula:

$$\begin{cases} C_{P0} = 0.5176 \left( \frac{116}{\lambda_i} - 0.4\beta - 5 \right) e^{-\frac{21}{\lambda_i}} + 0.0068 \lambda_{opt} \\ \frac{1}{\lambda_i} = \frac{1}{\lambda_{opt} + 0.08\beta} - \frac{0.035}{\beta^3 + 1} \end{cases}$$

where $C_{P0}$ is the calculated wind power coefficient; $\lambda_i$ is an intermediate variable; $\lambda_{opt}$ is the optimal tip speed ratio under MPPT mode; $\beta$ is the pitch angle command to be calculated.

The advantages and positive effects of the present invention are: compared to the conventional control scheme solely rely on the pitch angle control, the proposed FPR scheme can better restrain the rotor overspeed so as to guarantee the rotor operational security by timely switching on the DC chopper; compared to the existing DFIG power control schemes, the proposed FPR scheme introduces the DC chopper and executes the pitch angle control under normal rotor speed, which can fulfill the DFIG FPR requirements as well as effectively restrain generator rotor over-speed through the coordination with the RSC and GSC. By adjusting the pitch angle to decrease the amount of WTG mechanical power input, not only the rotor speed can be restrained within a secure level and eventually maintained at the optimal value under the MPPT mode before FPR, but also the unbalanced power is fundamentally eliminated so that the DC chopper is timely switched off to minimize the operating cost.

Wherein,
1. third multiplexer switch
2. fifth PI controller
3. pitch angle command lookup table
4. sixth inverting adder
5. wind power coefficient calculator
6. second inverting adder
7. third inverting adder
8. power conversion unit
9. third PI controller
10. second PI controller
11. first multiplexer switch
12. first PI controller
13. first inverting adder
14. fourth PI controller
15. fifth inverting adder
16. second multiplexer switch
17. DC-link voltage conversion unit
18. fourth inverting adder

DETAILED DESCRIPTION OF THE PRESENT INVENTION

In order to further understand the contents, features and effects of the present invention, the following embodiments will be listed and detailed with reference to the accompanying drawings:

As shown in FIGS. 1-7, an FPR system, comprising a pitch servo system, a DC-link and a rotor-side converter (RSC) and a grid-side converter (GSC) connected in parallel across the two poles of the DC-link; the AC side of RSC is electrically connected to the DFIG rotor windings, and the DC side of RSC is electrically connected to the positive and negative poles of the DC-link; the DC side of GSC is electrically connected to the positive and negative poles of the DC-link; the AC side of GSC is electrically connected to the power grid; and further comprising a DC chopper circuit including a dump resistor and a fully-controlled power switching device; the dump resistor and the fully-controlled power switching device are first connected in series and then connected to the positive and negative poles of the DC-link; the fully-controlled power switching device is driven by a power switching device driver; the power switching device driver comprises a first inverting adder 13, a first PI controller 12 and a PWM modem; the positive and negative input ends of the first inverting adder 13 receive real-time DC-link voltage signal and its threshold value respectively, and the output end of the first inverting adder 13 is connected to the input end of the first PI controller 12; the output end of the first PI controller 12 is connected to the input end of the PWM modem; the PWM modem outputs the pulse signal to the control end of the fully-controlled power switching device.

Figure 1:
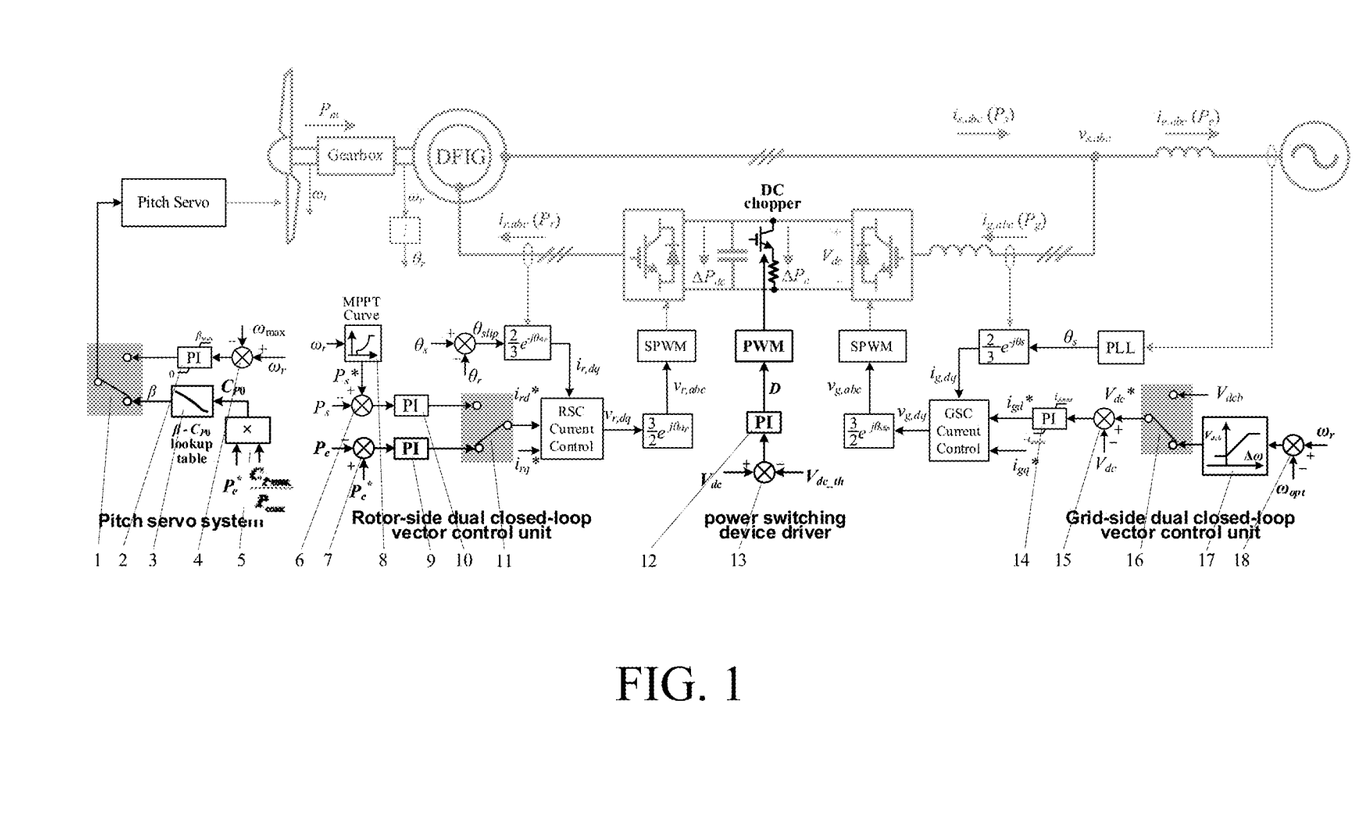
FIG. 1 is a control schematic diagram of the present invention.

In FIG. 1, $V_{dc}$ is the actual DC-link voltage; $V_{dc\_th}$ is the DC-link voltage threshold; the actual DC-link voltage $V_{dc}$ and the DC-link voltage threshold $V_{dc\_th}$ are input to the positive and negative input ends of the first inverting adder 13, wherein the actual DC-link voltage $V_{dc}$ can be obtained by the voltage measuring device and the DC-link voltage threshold $V_{dc\_th}$ is a preset value slightly higher than the averaged normal operational DC-link voltage from measurement.

SPWM modules are both employed in RSC and GSC, which generate the SPWM signals of a specified frequency to control the switch tubes of RSC and GSC.

The upper half of FIG. 1 presents the basic configuration of the grid-connected DFIG main system, wherein a DC chopper, which includes a fully-controlled power switching device and a dump resistor, is connected in parallel across the DC-link. The dashed box in the lower half of FIG. 1 shows the DFIG control system, wherein the un-bolded part presents the DFIG traditional control system and the bolded part shows the added control loops of the present invention. The first multiplexer switch 11, the second multiplexer switch16 and the third multiplexer switch 1 in the figure are used to select and switch between their different input signals.

The DFIG stator and rotor windings are directly/indirectly connected to the power grid. The AC power of grid nominal frequency generated from the stator windings is directly fed to the power grid, whereas the power generated from the rotor windings is connected to the power grid through the rectifier and inverter. Compared to the general asynchronous generator, the DFIG rotor speed is allowed to vary within a certain range. The prior art typically adopts the DC-link and connects the RSC and GSC in parallel across the positive and negative poles of the DC-link. By properly controlling RSC and GSC, the DFIG rotor speed can be adjusted by regulating the magnitude and frequency of the rotor current (equivalent to the exciting windings) and the stator output power and frequency can be controlled. When executing DFIG FPR, rotor overspeed phenomenon incurred from the unbalanced energy after FPR tends to occur solely relying on the controls of RSC and GSC. Therefore, the DC chopper circuit is introduced and the pitch angle control is executed under normal speed, so as to fulfill the FPR requirement as well as effectively prevent generator rotor overspeed together with RSC and GSC.

In addition to the introduction of the DC chopper circuit, the following modification to the RSC control loop is done in the present invention:

RSC is driven by an RSC dual closed-loop vector control unit; the RSC dual closed-loop vector control unit comprises an RSC inner current loop and an RSC outer power loop; wherein the RSC outer power loop consists of two branches, wherein one branch includes a power conversion unit 8 that converts the WTG rotor speed to the WTG stator active power reference, a second inverting adder 6 and a second PI controller 10 that connected in sequence; the other branch includes a third inverting adder 7 and a third PI controller 9 that connected in sequence; the output ends of the two branches are connected to the input end of the RSC inner current loop via a first multiplexer switch 11, the control end of the first multiplexer switch 11 receives the control signal from an upper-level controller; the power conversion unit 8 receives the signal of real-time rotor speed and outputs the stator active power reference according to the wind turbine MPPT curve; the positive input end of the second inverting adder 6 is connected to the output end of the power conversion unit8 and its negative input end receives the signal of actual stator active power; the positive and negative input ends of the third inverting adder 7 receive the FPR command value and the actual DFIG active power output to the grid respectively; the two data input ends of the first multiplexer switch 11 receive the active current references generated from the second PI controller 10 and the third PI controller 9 respectively. The actual DFIG active power output refers to the active power absorbed by the power grid which is output from WTG.

The signals received by the input ends of the RSC inner current loop may include active current reference and reactive current reference. The data output end of the first multiplexer switch 11 is connected to the input end of RSC inner current loop that receives the active current reference.

Real-time rotor speed of DFIG WTG can be obtained by rotating speed measuring device. The actual active power output to the grid is the difference between stator active power and the active power fed into GSC. The SPWM module of RSC can adopt the existing SPWM module, which generates the SPWM switching signals of a specified frequency to control the switching tubes of RSC according to the three-phase voltage reference signals output from the RSC inner current loop.

As shown in FIG. 1, PLL represents the phase-locked loop; $i_{s,abc}$ represents the three-phase stator current; $i_{r,abc}$ represents the three-phase currents flowing into the rotor windings; $i_{g,abc}$ represents the three-phase current flowing into the GSC; $i_{e,abc}$ represents the three-phase current injecting into the power grid; $v_{s,abc}$ is three-phase voltage at the point of common coupling (PCC); and $\theta_s$ is the leading phase angle of the vector synthesized from PCC voltage $v_{s,abc}$ with respect to A-phase axis.

PLL is used to measure the three-phase PCC voltage $v_{s,abc}$ and generate the leading phase angle of the vector synthesized from PCC voltage $V_{s,abc}$ with respect to A-phase axis $\theta_s$, which is an input parameter to do Park transformations (from abc components to dq components) and inverse Park transformations (from dq components to abc components) of the three-phase stator and grid-side voltages and currents.

In the RSC dual closed-loop vector control unit as shown in FIG. 1, $\theta_s$ is the leading phase angle of the vector synthesized from PCC voltage $v_{s,abc}$ with respect to A-phase axis, $\theta_r$ is the electrical rotating angle of the rotor with respect to stator, $\theta_{slip}$ is the leading electrical angle of the PCC voltage vector with respect to rotor; $i_{r,dq}$ are d-axis and q-axis components of rotor currents. $\omega_r$ is the DFIG real-time rotor speed, $P_m$ is the DFIG mechanical power input; $P_s$ is the actual stator active power; $P_s^*$ is the stator active power reference, $P_e$ is the actual active power output to the power grid; $P_e^*$ is the FPR command value; $i_{rd}^*$ is the rotor active current reference input to the inner current loop and $i_{rq}^*$ is the rotor reactive current reference input to the inner current loop; and $v_{r,abc}$ is the three-phase voltage reference signal output from the RSC inner current loop.

The leading electrical angle of the PCC voltage vector with respect to rotor $\theta_{slip}$ is the error between the leading phase angle of the vector synthesized from PCC voltage $v_{s,abc}$ with respect to A-phase axis $\theta_s$ and the electrical rotating angle of the rotor with respect to stator θr; the leading electrical angle of the PCC voltage vector with respect to rotor $\theta_{slip}$ is an input parameter to do the Park transformations and inverse Park transformations of the three-phase rotor voltages and currents so as to generate the d and q components of rotor currents $i_{r,dq}$.

The power conversion unit8 converts the real-time rotor speed $\omega_r$ to the stator active power reference $P_s^*$. The positive and negative input ends of the second inverting adder6 receive the signals of the stator active power reference $P_s^*$ and real-time stator active power $P_s$ respectively, the positive and negative input ends of the third inverting adder7 receive the signal of the FPR command value $P_e^*$ and real-time active power output to the grid $P_e$ respectively, the first multiplexer switch 11 outputs the rotor active current reference $i_{rd}^*$ to the RSC inner current loop. The rotor reactive current reference $i_{rq}^*$ input to the RSC inner current loop can be can be set according to the relevant reactive power support requirement.

The FPR command $P_e^*$ refers to the objective value of the controlled DFIG active power output to the gird, which is generated from an upper-level controller.

Further, the following modification to the GSC control loop is done compared to the prior art:

GSC is driven by a GSC dual closed-loop vector control unit; the GSC dual closed-loop vector control unit comprises a GSC inner current loop and a GSC outer voltage loop; wherein the GSC outer voltage loop consists of a DC-link voltage conversion unit 17 that converts the rotor speed deviation to the DC-link voltage reference, a fourth inverting adder 18, a fifth inverting adder 15, a fourth PI controller 14 and a second multiplexer switch 16; the real-time rotor speed and the optimal rotor speed under MPPT mode are input to the positive and negative input ends of the fourth inverting adder 18, the fourth inverting adder 18 outputs the rotor speed deviation to the DC-link voltage conversion unit 17, the DC-link voltage conversion unit 17 outputs a DC-link voltage reference; the two data input ends of the second multiplexer switch 16 receive the rated DC-link voltage and the DC-link voltage reference generated from the DC-link voltage conversion unit 17 respectively; the output end of the second multiplexer switch 16 is connected to the positive input end of the fifth inverting adder 15; the negative input end of the fifth inverting adder 15 receives signal of the real-time DC-link voltage, the fifth inverting adder 15 outputs the DC-link voltage deviation to the fourth PI controller 14; the fourth PI controller 14 outputs the reference of active current flowing into GSC to the GSC inner current loop; the control end of the second multiplexer switch 16 receives the control signal from the upper-level controller. The optimal rotor speed under MPPT mode can be obtained by algorithms in the prior art.

In the GSC dual closed-loop vector control unit as shown in FIG. 1, $V_{dcb}$ is the rated DC-link voltage; $V_{dcmax}$ is the maximum DC-link voltage; $i_{gd}^*$ is the GSC active current reference input to the GSC inner current loop; $i_{gq}^*$ is the GSC reactive power reference input to the GSC inner current loop; $v_{g,abc}$ is the three-phase voltage reference signal output from the GSC inner current loop; $\omega_r$ is the real-time rotor speed; $\omega_{opt}$ is the optimal rotor speed; $V_{dc}$ is the real-time DC-link voltage; and $V_{dc}^*$ is the DC-link voltage reference.

The outer voltage loop of the GSC dual closed-loop vector control unit outputs the GSC active current reference $i_{gd}^*$ and the GSC reactive power reference $i_{gq}^*$ to the GSC inner current loop, the GSC inner current loop of the GSC dual closed-loop vector control unit outputs the three-phase GSC voltage reference $v_{g,abc}$.

The signals input to the positive and negative input ends of the fourth inverting adder18 are the DFIG real-time rotor speed $\omega_r$ and the optimal rotor speed $\omega_{opt}$ under MPPT mode respectively, and the signals input to the two data input ends of the second multiplexer switch 16 are the rated DC-link voltage $V_{dcb}$ and the DC-link voltage reference output from the DC-link voltage conversion unit 17; the second multiplexer16 outputs the DC-link voltage reference $V_{dc}^*$, the input signals of the positive and negative input ends of the fifth inverter 15 are the DC-link voltage reference signal $V_{dc}^*$ and the real-time DC-link voltage $V_{dc}$, the fourth PI controller 14 outputs the GSC active current reference $i_{gd}^*$ to the GSC inner current loop. The GSC reactive current reference $i_{gq}^*$input to the GSC inner current loop can be set according to the relevant reactive power support requirement.

The signals received by the input ends of the GSC inner current loop may include active current reference and reactive current reference. The fourth PI controller 14 outputs the active current reference for GSC inner current loop.

The SPWM module can adopt the existing SPWM module, which generates the SPWM switching signals of a specified frequency to control the switching tubes of GSC according to the three-phase voltage reference signal output from the GSC inner current loop.

Further, the following modification to the control loop of pitch servo system is done compared to the prior art:

the pitch servo system comprises a pitch servo driver that drives the pitch servo motor, a wind power coefficient calculator 5, a pitch angle command lookup table 3, a sixth inverting adder 4, a fifth PI controller 2 and a third multiplexer switch 1; the wind power coefficient calculator 5 receives the FPR command value and outputs a wind power coefficient to the pitch angle command lookup table 3, wherein the wind power coefficient is calculated in the condition that the captured mechanical power input by WTG is equal to the FPR command; the pitch angle command lookup table 3 outputs a pitch angle command corresponding to the calculated wind power coefficient; the positive and negative input ends of the sixth inverting adder 4 receive signals of real-time rotor speed and the rated rotor speed respectively, the output end of the sixth inverting adder 4 is connected to the input end of the fifth PI controller 2; the fifth PI controller 2 outputs a pitch angle reference; the two data input ends of the third multiplexer switch 1 receive the pitch angle command from the pitch angle command lookup table 3 and the pitch angle reference from the fifth PI controller 2; the data output end of the third multiplexer switch 1 is connected to the pitch servo driver; the control end of the third multiplexer switch 1 receives the control signal from the upper-level controller.

In the pitch servo system as shown in FIG. 1, $\omega_r$ is the real-time rotor speed, $\omega_{max}$ is the rated rotor speed, $\omega_{opt}$ is the optimal rotor speed under MPPT mode; $P_{max}$ represents the maximum wind power that WTG can capture when operating under MPPT mode, $C_{Pmax}$ is the maximum wind power coefficient, $C_{P0}$ is the calculated wind power coefficient in the condition that the captured mechanical power input by WTG is equal to the FPR command; $P_e^*$ is the FPR command value; Bis the pitch angle reference for the pitch servo.

The signals input to the positive and negative input ends of the sixth inverting adder 4 are the real-time rotor speed $\omega_r$ and the rated rotor speed $\omega_{max}$ respectively. The fifth PI controller 2 outputs the pitch angle reference. The wind power coefficient calculator 5 receives the FPR command $P_e^*$, the maximum wind power that WTG can capture when operating under MPPT mode $P_{max}$ and the maximum wind power coefficient $C_{Pmax}$ and outputs the wind power coefficient $C_{P0}$ in the condition that the captured mechanical power input by WTG is equal to the FPR command, the calculated wind power coefficient $C_{P0}$ is input to the pitch angle command lookup table 3.

The present invention also provides an embodiment of a method of FPR system of DFIG, comprising: adopting the pitch servo system, the DC-link and the rotor-side converter (RSC) and the grid-side converter (GSC) connected in parallel across the two poles of the DC-link for regulation and control purpose, and further introducing the DC chopper circuit including the dump resistor and the fully-controlled power switching device; first connecting the dump resistor and the fully-controlled power switching device in series and then connecting them to the positive and negative poles of the DC-link; the fully-controlled power switching device is driven by the power switching device driver; adopting the first inverting adder 13, the first PI controller 12 and the PWM modem in the power switching device driver; inputting the real-time DC-link voltage signal and its threshold value to the positive and negative input ends of the first inverting adder 13 respectively, outputting the signal from the first inverting adder 13 to the first PI controller 12; outputting the signal from the first PI controller 12 to the PWM modem in order to regulate the duty cycle of the pulse signal generated from PWM modem; outputting the pulse signal from the PWM modem to the control end of the fully-controlled power switching device.

The present invention adopts the method of introducing the DC chopper circuit and coordinates it with the rectifier and inverter to well fulfill the requirements of DFIG FPR.

In addition to the introduction of a DC chopper circuit, the following modification to the RSC control loop is done:

RSC is driven by the RSC dual closed-loop vector control unit; adopting the RSC inner current loop and the RSC outer power loop in the RSC dual closed-loop vector control unit; wherein two branches are introduced in the RSC outer power loop, wherein one branch includes a power conversion unit 8 that converts the rotor speed to the WTG stator active power reference, a second inverting adder 6 and a second PI controller 10 that connected in sequence; the other branch includes a third inverting adder 7 and a third PI controller 9 that connected in sequence; inputting the real-time rotor speed to the power conversion unit and outputting the stator active power reference from the power conversion unit 8 according to the wind turbine MPPT curve; calculating the error between the stator active power reference and the actual stator active power by the second inverting adder 6, and inputting the error to the second PI controller 10; calculating the error between the FPR command value and the actual DFIG active power output by the third inverting adder 7; and inputting the error to the third PI controller 9; outputting the active current reference signals from the second PI controller 10 and the third PI controller 9 to the two data input ends of the first multiplexer switch 11; selecting between the signals output from the output ends of the second PI controller 10 and the third PI controller 9 via the first multiplexer switch 11 based on the received control signal from the upper-level controller and transmitting it to the input end of the RSC inner current loop.

Further, the following modification to the GSC control loop is done:

GSC is driven by the GSC dual closed-loop vector control unit; adopting the GSC inner current loop and the GSC outer voltage loop in the GSC dual closed-loop vector control unit; wherein the GSC outer voltage loop introduces the DC-link voltage conversion unit 17 that converts the rotor speed deviation to the DC-link voltage reference, the fourth inverting adder 18, the fifth inverting adder 15, the fourth PI controller 14 and the second multiplexer switch 16; calculating the error between the real-time rotor speed and the optimal rotor speed under MPPT mode through the fourth inverting adder 18 and converting the error into the DC-link voltage reference through the DC-link voltage conversion unit; selecting between the signals of the rated DC-link voltage and the DC-link voltage reference via the second multiplexer switch 16 based on the received control signal from the upper-level controller and transmitting it to the positive input end of the fifth inverting adder 15, inputting the real-time DC-link voltage to the negative input end of the fifth inverting adder 15; connecting the output end of the fifth inverting adder 15 to the input end of the fourth PI controller 14; outputting the reference of active current flowing into GSC from the fourth PI controller 14 to the GSC inner current loop.

Further, the following modification to the pitch servo system is done:

the pitch servo system adopts the pitch servo driver that drives the pitch servo motor, the wind power coefficient calculator 5, the pitch angle command lookup table 3, the sixth inverting adder 4 and the fifth PI controller 2 and the third multiplexer switch 1; inputting the FPR command to the wind power coefficient calculator 5, outputting the wind power coefficient from the wind power coefficient calculator 5 to the pitch angle command lookup table 3, wherein the wind power coefficient is calculated in the condition that the captured mechanical power input by WTG is equal to the FPR command; outputting the pitch angle command corresponding to the calculated wind power coefficient from the pitch angle command lookup table 3; calculating the error between the real-time DFIG rotor speed and its rated value through the sixth inverting adder 4 and outputting this error to the fifth PI controller 2; outputting the pitch angle reference from the fifth PI controller 2; selecting between signals of the pitch angle command and the pitch angle reference via the third multiplexer switch 1 based on the received control signal from the upper-level controller and inputting it to the pitch servo driver.

Preferably, the wind power coefficient calculator 5 calculates the wind power coefficient in the condition that the captured mechanical power input by WTG is equal to the FPR command, based on the following formular:

$$C_{P0} = \frac{P_m}{P_0} = \frac{P_e^*}{P_{max}} C_{Pmax}$$

where $C_{P0}$ is the calculated wind power coefficient, $P_m$ is the WTG mechanical power input, $P_e^*$ is the FPR command value, $P_0$ is the wind power that drives the blades of the wind turbine to rotate, $P_{max}$ is the maximum mechanical power of WTG operating under MPPT mode and $C_{Pmax}$ is the maximum wind power coefficient.

Preferably, the pitch angle command lookup table 3 is established by the following approach:

establishing the relationship between the wind power coefficient and tip speed ratio, and making the tip speed ratio equal to its optimal value under the MPPT mode, so that the pitch angle command value corresponding to the above calculated wind power coefficient can be derived from the following formula:

$$\begin{cases} C_{P0} = 0.5176\left(\dfrac{116}{\lambda_i} - 0.4\beta - 5\right)e^{-\frac{21}{\lambda_i}} + 0.0068\lambda_{opt} \\ \dfrac{1}{\lambda_i} = \dfrac{1}{\lambda_{opt} + 0.08\beta} - \dfrac{0.035}{\beta^3 + 1} \end{cases}$$

where $C_{P0}$ is the calculated wind power coefficient; $\lambda_i$ is an intermediate variable; $\lambda_{opt}$ is the optimal tip speed ratio under MPPT mode; $\beta$ is the pitch angle command to be calculated.

The aforementioned control signal from the upper-level controller can be the control command generated from the overall DFIG control system or upper computer like the power distribution system. The aforementioned control signal from the upper-level controller is synchronized with the FPR command.

The aforementioned function modules, which include the first to the third multiplexer switch, the first to the fifth inverting adder, the first to the fifth PI controller, the power conversion unit, the DC-link voltage conversion unit, the wind power coefficient calculator and the pitch angle command lookup table, can be constructed by adopting the software algorithms and hardware structures in the prior art. All the direct input signals of the aforementioned function modules can be obtained by the measuring methods and the calculation algorithms in the prior art.

The structure, workflow and operating principle of the present invention are further explained by a preferred embodiment of the present invention as follows.

Refer to FIG. 1, an FPR system, comprising a pitch servo system, a DC-link and a rotor-side converter (RSC) and a grid-side converter (GSC) connected in parallel across the two poles of the DC-link; the AC side of RSC is electrically connected to the DFIG rotor windings, and the DC side of RSC is electrically connected to the positive and negative poles of the DC-link; the DC side of GSC is electrically connected to the positive and negative poles of the DC-link; the AC side of GSC is electrically connected to the power grid; and further comprising a DC chopper circuit including a dump resistor and a fully-controlled power switching device; the dump resistor and the fully-controlled power switching device are first connected in series and then connected to the positive and negative poles of the DC-link.

The fully-controlled power switching device is driven by a power switching device driver; the power switching device driver comprises a first inverting adder 13, a first PI controller 12 and a PWM modem; the positive and negative input ends of the first inverting adder 13 receive real-time DC-link voltage signal and its threshold value respectively, and the output end of the first inverting adder 13 is connected to the input end of the first PI controller 12; the output end of the first PI controller 12 is connected to the input end of the PWM modem; the PWM modem outputs the pulse signal to the control end of the fully-controlled power switching device.

RSC is driven by an RSC dual closed-loop vector control unit; the RSC dual closed-loop vector control unit comprises an RSC inner current loop and an RSC outer power loop; wherein the RSC outer power loop consists of two branches, wherein one branch includes a power conversion unit 8 that converts the WTG rotor speed to the WTG stator active power reference, a second inverting adder 6 and a second PI controller 10 that connected in sequence; the other branch includes a third inverting adder 7 and a third PI controller 9 that connected in sequence; the output ends of the two branches are connected to the input end of the RSC inner current loop via a first multiplexer switch 11, the control end of the first multiplexer switch 11 receives the control signal from an upper-level controller; the power conversion unit 8 receives the signal of real-time rotor speed and outputs the stator active power reference according to the wind turbine MPPT curve; the positive input end of the second inverting adder 6 is connected to the output end of the power conversion unit 8 and its negative input end receives the signal of actual stator active power; the positive and negative input ends of the third inverting adder 7 receive the FPR command value and the actual DFIG active power output to the grid respectively; the two data input ends of the first multiplexer switch 11 receive the active current references generated from the second PI controller 10 and the third PI controller 9 respectively.

GSC is driven by a GSC dual closed-loop vector control unit; the GSC dual closed-loop vector control unit comprises a GSC inner current loop and a GSC outer voltage loop; wherein the GSC outer voltage loop consists of a DC-link voltage conversion unit 17 that converts the rotor speed deviation to the DC-link voltage reference, a fourth inverting adder 18, a fifth inverting adder 15, a fourth PI controller 14 and a second multiplexer switch 16; the real-time rotor speed and the optimal rotor speed under MPPT mode are input to the positive and negative input ends of the fourth inverting adder 18, the fourth inverting adder 18 outputs the rotor speed deviation to the DC-link voltage conversion unit 17, the DC-link voltage conversion unit 17 outputs a DC-link voltage reference; the two data input ends of the second multiplexer switch 16 receive the rated DC-link voltage and the DC-link voltage reference generated from the DC-link voltage conversion unit 17 respectively; the output end of the second multiplexer switch 16 is connected to the positive input end of the fifth inverting adder 15; the negative input end of the fifth inverting adder 15 receives signal of the real-time DC-link voltage, the fifth inverting adder 15 outputs the DC-link voltage deviation to the fourth PI controller 14; the fourth PI controller 14 outputs the reference of active current flowing into GSC to the GSC inner current loop; the control end of the second multiplexer switch 16 receives the control signal from the upper-level controller.

The pitch servo system comprises a pitch servo driver that drives the pitch servo motor, a wind power coefficient calculator 5, a pitch angle command lookup table 3, a sixth inverting adder 4, a fifth PI controller 2 and a third multiplexer switch 1; the wind power coefficient calculator 5 receives the FPR command value and outputs a wind power coefficient to the pitch angle command lookup table 3, wherein the wind power coefficient is calculated in the condition that the captured mechanical power input by WTG is equal to the FPR command; the pitch angle command lookup table 3 outputs a pitch angle command corresponding to the calculated wind power coefficient; the positive and negative input ends of the sixth inverting adder 4 receive signals of real-time rotor speed and the rated rotor speed respectively, the output end of the sixth inverting adder 4 is connected to the input end of the fifth PI controller 2; the fifth PI controller 2 outputs a pitch angle reference; the two data input ends of the third multiplexer switch 1 receive the pitch angle command from the pitch angle command lookup table 3 and the pitch angle reference from the fifth PI controller 2; the data output end of the third multiplexer switch 1 is connected to the pitch servo driver; the control end of the third multiplexer switch 1 receives the control signal from the upper-level controller.

According to FIG. 1, the present invention is implemented by modifying the conventional dual closed-loop control strategy of RSC and GSC, redesigning the pitch angle control strategy and introducing the DC chopper control. When the present control system receives the FPR command, it instantly switches from the conventional control scheme to the present one through the first to the third multiplexer switch shown in FIG. 1 that act synchronously with the FPR command.

The operating principle of the present invention can be explained from the following four aspects:

1. DC chopper control: to implement FPR and timely suppress the rotor overspeed, a triggering threshold slightly higher than the normal operating level of DC-link voltage is applied to the DC chopper control. The DC chopper is switched on when the DC-link voltage is higher than the threshold. Meanwhile, as the continuous variation of DC chopper power dissipation is necessary to ensure a smooth active power output, PI controller is employed to dynamically adjust the duty cycle of PWM controlling the DC chopper switch based on the real-time DC-link voltage. Specifically, the first PI controller receives the error between the real-time DC-link voltage and its preset threshold and outputs the high-frequency PWM signal of the duty cycle D (0≤D≤1) to control the fully controlled power switching device of the DC chopper, i.e.:

$$D = k_{pc}(V_{dc} - V_{dc\_th}) + k_{ic} \hat{O}(V_{dc} - V_{dc\_th}) dt, 0, D, 1$$

where $V_{dc}$ is the real-time DC-link voltage, $V_{dc\_th}$ is the DC-link voltage threshold, $k_{pc}$ and $k_{ic}$ are the proportional and integral coefficients of the DC chopper PI controller, respectively.

2. RSC direct active power control: DFIG active power output can be directly reduced to the FPR command by controlling RSC. For this purpose, conventional control strategy continues to be used in the active power inner control loop and the reactive power outer and inner control loop of the RSC dual closed-loop vector control unit, with revising the active power outer control loop as: obtaining the FPR command $P_e^*$ and the actual DFIG active power output $P_e$, and sending their error to the third PI controller to calculate the active current reference for the RSC inner current loop, the formular of which is:

$$i_{rd}^* = k_{p1}(P_e^* - P_e) + k_{i1} \hat{O}(P_e^* - P_e) dt$$

where $i_{rd}^*$ represents the active current reference input to the RSC inner current loop, $P_e$ represents the actual active power; $P_e^*$ is the FPR command value; $k_{p1}$ and $k_{i1}$ are the proportional and integral coefficients of the RSC direct active power controller.

3. GSC DC-link voltage—rotor speed droop control: to timely switching on the DC chopper for surplus energy dissipation, DC-link voltage should be controlled to rise with the increase of the rotor speed when the rotor speed rises above its optimal value under MPPT mode $\omega_{opt}$. For this purpose, conventional dual closed-loop control scheme continues to be used in GSC control, with the DC-link voltage reference signal dynamically adjusted according to the DFIG real-time rotor speed $\omega_r$ as shown in the following formular:

$$V_{dc} = V_{dcb} + k(w_r - w_{opt}) V_{dcb} £ V_{dc}^* £ V_{dcmax}$$

where $V_{dcb}$ is the rated DC voltage, $V_{dcmax}$ is the maximum allowable DC voltage, $\omega_r$ is the real-time DFIG rotor speed, $\omega_{opt}$ is the optimal rotor speed under MPPT mode; k is the droop coefficient of the DC-link voltage-rotor speed droop curve.

4. Fast pitch angle control: by adjusting the pitch angle to decrease the mechanical power input, the rotor speed can be further restrained and maintained to its optimal value under MPPT mode before FPR, and the unbalanced energy can be fundamentally eliminated that switches off the DC chopper and minimizes the operating cost. Considering the poor performance of the conventional pitch angle control, a fast pitch control scheme is introduced in the present invention, which calculates the pitch angle command β according to the FPR command $P_e^*$ and through the following two steps:

1) calculates the expected power coefficient $C_{P0}$ based on the following formular, aiming in the final steady state the captured mechanical power input $P_m$ is equal to $P_e^*$:

$$C_{P0} = \frac{P_m}{P_0} = \frac{P_e^*}{P_{max}} C_{Pmax}$$

where $C_{P0}$ is the calculated wind power coefficient, $P_m$ is the WTG mechanical power input, $P_e^*$ is the FPR command value, $P_0$ is the wind power that drives the blades of the wind turbine to rotate, $P_{max}$ is the maximum mechanical power of WTG operating under MPPT mode and $C_{Pmax}$ is the maximum wind power coefficient.

2) substitutes the calculated wind power coefficient $C_{P0}$ by Step 1 to the following relation between the wind power coefficient and tip speed ratio, and make the tip speed ratio equal to the optimal tip speed ratio $\lambda_{opt}$ under MPPT mode, then the pitch angle command β can be obtained:

$$\begin{cases} C_{P0} = 0.5176 \left( \frac{116}{\lambda_i} - 0.4\beta - 5 \right) e^{-\frac{21}{\lambda_i}} + 0.0068 \lambda_{opt} \\ \frac{1}{\lambda_i} = \frac{1}{\lambda_{opt} + 0.08\beta} - \frac{0.035}{\beta^3 + 1} \end{cases}$$

where $C_{P0}$ is the calculated wind power coefficient; $\lambda_i$ is an intermediate variable; $\lambda_{opt}$ is the optimal tip speed ratio under MPPT mode; β is the pitch angle command.

Figure 2:
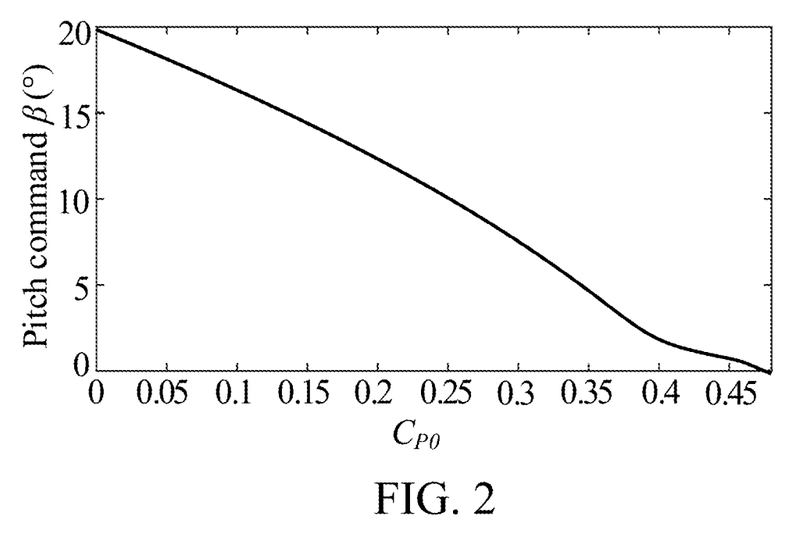
FIG. 2 is the pitch angle—wind power coefficient ($\beta$-$C_{P0}$) lookup curve employed in the proposed pitch angle control loop of the present invention.

The β-$C_{P0}$ relationship obtained by the above formular can be presented in the form of a two-dimensional curve as shown in FIG. 2. To facilitate the programming of the control program, the above formular is usually converted into a β-$C_{P0}$ lookup table.

Figure 3:
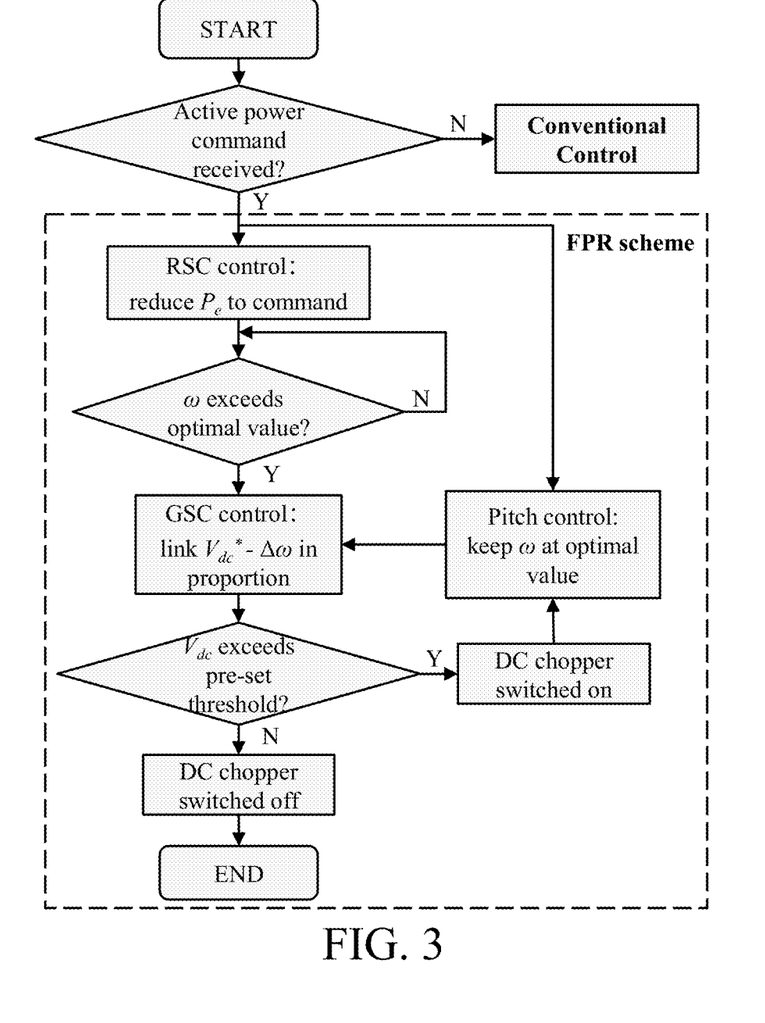
FIG. 3 is a workflow diagram of the present invention.

FIG. 3 shows the workflow of the FPR system of the present invention:

At the reception of an FPR command, the active power output is directly reduced to the FPR command value by the RSC direct active power controller. The excessive active power incurred from FPR is initially accumulated as rotor kinetic energy, temporarily increasing the generator rotor speed. With the control of the GSC dual closed-loop vector control unit, the DC-link voltage increases with rotor speed. When the DC-link voltage reaches upon the triggering threshold, the DC chopper is switched on immediately by its power switching device driver to quickly dissipate the excessive energy and timely restrain rotor speed rise. Meanwhile, the pitch angle is increased at the maximum rate by the pitch servo driver to further restrain the rotor speed rise. The DC-link voltage is gradually reduced below the chopper triggering threshold with the decrease of rotor speed, and eventually the DC chopper is switched off and the rotor speed is maintained at the optimal value under MPPT mode before FPR.

Figure 4:
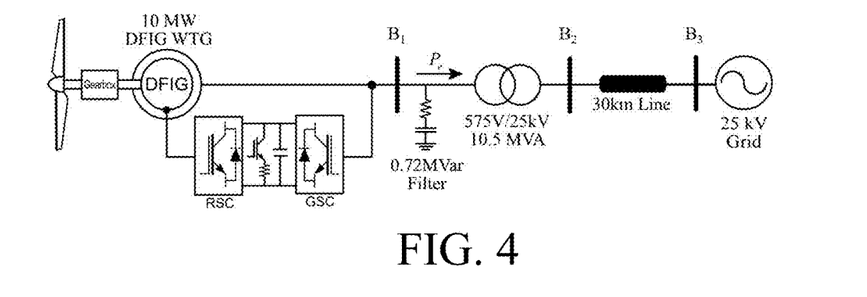
FIG. 4 is a single line diagram of the simulated DFIG main system to verify the validity and advantages of the present invention.
Figure 5:
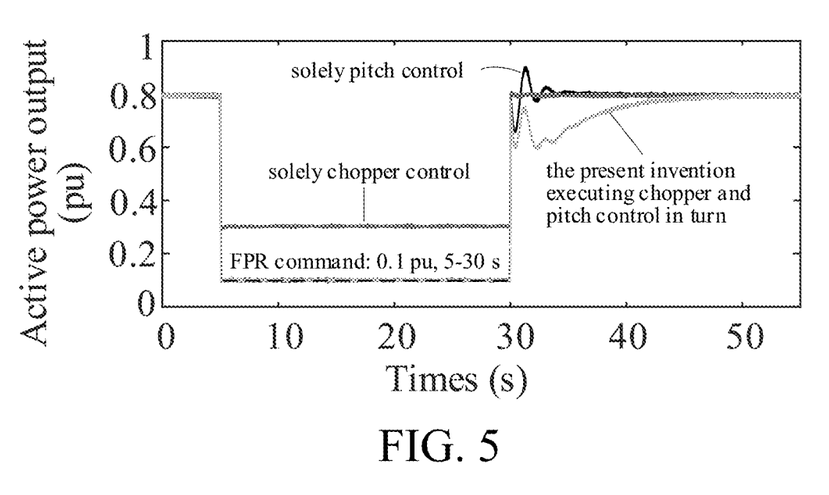
FIG. 5 shows the simulated transient response curves of DFIG active power output when DFIG WTG executes FPR and then restores MPPT operation under three different control methods: a conventional active power control method solely relying on the pitch angle to suppress rotor overspeed, a typical active power control method solely relying on the DC chopper to suppress rotor overspeed; the FPR method coordinately controlling the DC chopper and pitch angle to suppress rotor overspeed of the present invention.
Figure 6:
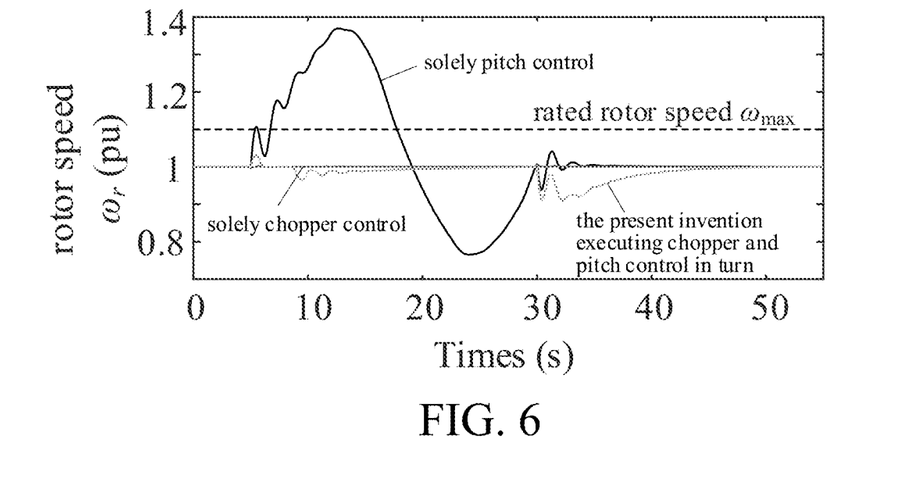
FIG. 6 shows the simulated transient response curves of DFIG rotor speed when DFIG WTG executes FPR and then restores MPPT operation under three different control methods: a conventional active power control method solely relying on the pitch angle to suppress rotor overspeed; a typical active power control method solely relying on the DC chopper to suppress rotor overspeed; the FPR method coordinately controlling the DC chopper and pitch angle to suppress rotor overspeed of the present invention.
Figure 7:
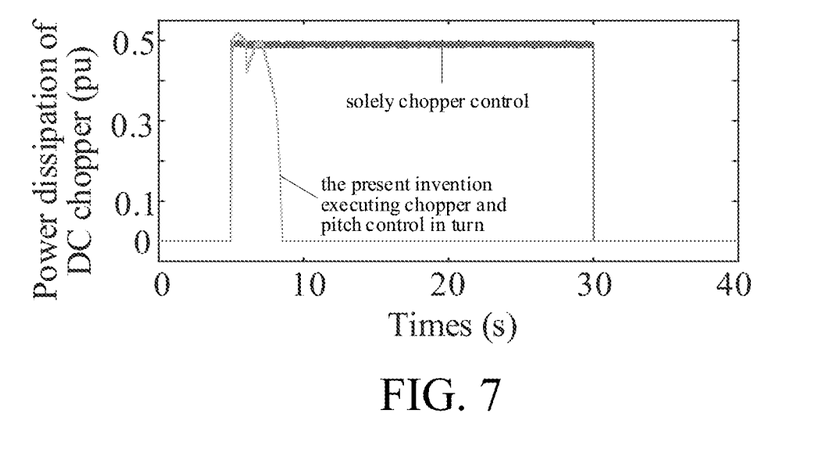
FIG. 7 shows the simulated transient response curves of power dissipation of DC chopper when DFIG WTG executes FPR and then restores MPPT operation under two different control methods: a typical active power control method solely relying on the DC chopper to suppress rotor overspeed; the FPR method coordinately controlling the DC chopper and pitch angle to suppress rotor overspeed of the present invention.

A simulation model of a grid connected DFIG system as shown in FIG. 4 can be built in MATLAB/Simulink simulation software, wherein RSC and GSC are represented as two-level converter detailed models, and a10 MW DFIGWTG is connected to a 25 kV grid through a 575V/25 kV step-up transformer and a 30 km power line. The GSC is rated at 50% of the DFIG nominal rating. The DFIGWTG is initially working in MPPT mode at wind speed 10 m/s, which results in a rotor speed of 1 pu and a total active power output of 0.8pu. An FPR command is applied at t=5 s which orders the DFIG active power to drop to 0.1 pu and lasts for a period of 25 s, wherein pu is per-unit which is a numerical marking method commonly used in power system analysis and engineering calculation and is used to express the relative values of physical quantities and parameters. The communication delays in all stages are ignored. The response curves of FPR are compared under the scheme solely using the pitch angle, the scheme solely using the DC chopper and the present scheme coordinatively controlling DC chopper and pitch angle. Seen from FIG. 5, both the present scheme and the one solely using the pitch angle can reduce the DFIG active power outputs instantly to the FPR command, whereas the active power output of the scheme solely using the DC chopper fails to track the FPR command due to the continuous existence of the unbalanced energy and the limited capacity of GSC; seen from FIG. 6, the DFIG WTG under the scheme solely using the pitch angle has higher risks of rotor overspeed, whereas the present invention can timely restrain the rotor overspeed by quickly switching on the DC chopper; seen from in FIG. 7, compared with the scheme solely using the DC chopper, the proposed FPR scheme minimizes the operating period of the DC chopper and thus reduces the operating cost.

The aforementioned embodiment is merely used to illustrate the technical ideas and features of the present invention, to enable those skilled in the technical field to understand the content of the present invention and implement the present invention accordingly. The patent scope of the present invention is not limited by the above embodiment. That is, any equivalent changes or modifications to the spirit disclosed in the present invention still fall into the patent scope of the present invention.

What is claimed is:

1. A Fast active Power output Reduction (FPR) system, comprising:
   a pitch servo system,
   a DC-link and a rotor-side converter (RSC) and
   a grid-side converter (GSC) connected in parallel across positive and negative poles of the DC-link; and
   a DC chopper circuit, which includes a dump resistor and a fully controlled power switching device, wherein the dump resistor and the fully controlled power switching device are first connected in series and then connected to the positive and negative poles of the DC-link, respectively; the fully controlled power switching device being driven by a power switching device driver; the power switching device driver comprising a first inverting adder, a first PI controller and a PWM modem;
   positive and negative input ends of the first inverting adder receiving a real-time DC-link voltage signal and a threshold value of the real-time DC-link voltage signal respectively, and the output end of the first inverting adder being connected to an input end of the first PI controller; an output end of the first PI controller being connected to an input end of the PWM modem; and the PWM modem out putting the pulse signal to the control end of the fully controlled power switching device.

2. The FPR system according to claim 1, wherein the RSC is driven by an RSC dual closed-loop vector control unit; the RSC dual closed-loop vector control unit comprising an RSC inner current loop and an RSC outer power loop; wherein the RSC outer power loop consists of two branches, wherein one branch includes (a) a power conversion unit that converts a wind turbine generator (WTG) rotor speed to a WTG stator active power reference, (b) a second inverting adder and (c) a second PI controller that are connected in sequence; the other branch includes (a) a third inverting adder and (b) a third PI controller that are connected in sequence; output ends of the two branches are connected to the input end of the RSC inner current loop via a first multiplexer switch, a control end of the first multiplexer switch receives a control signal from an upper-level controller; the power conversion unit receives a signal of a real-time rotor speed and outputs the WTG stator active power reference according to a wind turbine MPPT curve; the second inverting adder, whose positive input end is connected to the output end of the power conversion unit, and whose negative input end receives a signal of actual stator active power; positive and negative input ends of the third inverting adder receive an FPR command value and an actual doubly-fed induction generator (DFIG) active power output to the grid respectively; two data input ends of the first multiplexer switch receive the active current references generated from the second PI controller and the third PI controller respectively.

3. The FPR system according to claim 2, wherein the GSC is driven by a GSC dual closed-loop vector control unit; the GSC dual closed-loop vector control unit comprising a GSC inner current loop and a GSC outer voltage loop; wherein the GSC outer voltage loop consists of a DC-link voltage conversion unit that converts a rotor speed deviation to a DC-link voltage reference, a fourth inverting adder, a fifth inverting adder, a fourth PI controller and a second multiplexer switch; a real-time rotor speed and an optimal rotor speed under an MPPT mode are input to positive and negative input ends of the fourth inverting adder, the fourth inverting adder outputs the rotor speed deviation to the DC-link voltage conversion unit, the DC-link voltage conversion unit outputs the DC-link voltage reference; two data input ends of the second multiplexer switch receive a rated DC-link voltage and the DC-link voltage reference generated from the DC-link voltage conversion unit respectively; an output end of the second multiplexer switch is connected to a positive input end of the fifth inverting adder; a negative input end of the fifth inverting adder receives signal of the real-time DC-link voltage, the fifth inverting adder outputs a DC-link voltage deviation to the fourth PI controller; the fourth PI controller outputs a reference of active current flowing into GSC to the GSC inner current loop; a control end of the second multiplexer switch receives a control signal from an upper-level controller.

4. The FPR system according to claim 3, wherein a pitch servo system comprising a pitch servo driver that drives a pitch servo motor, a wind power coefficient calculator, a pitch angle command lookup table, a sixth inverting adder, a fifth PI controller and a third multiplexer switch;
   the wind power coefficient calculator receiving an FPR command value and a maximum mechanical power of WTG operating under an MPPT mode and outputting a wind power coefficient to the pitch angle command lookup table; wherein the wind power coefficient being calculated in the condition that a captured mechanical power input by WTG is equal to the FPR command;

the pitch angle command lookup table outputting a pitch angle command corresponding to a calculated wind power coefficient;

positive and negative input ends of the sixth inverting adder receiving signals of a real-time rotor speed and a rated rotor speed respectively, the output end of the sixth inverting adder being connected to the input end of the fifth PI controller; the fifth PI controller outputting a pitch angle reference; two data input ends of the third multiplexer switch receiving the pitch angle command from the pitch angle command lookup table and the pitch angle reference from the fifth PI controller; data output end of the third multiplexer switch being connected to the pitch servo driver; the control end of the third multiplexer switch receiving a control signal from an upper-level controller.

* * * * *